(12) United States Patent
Wilson et al.

(10) Patent No.: US 8,896,480 B1
(45) Date of Patent: Nov. 25, 2014

(54) SYSTEM FOR AND METHOD OF DISPLAYING AN IMAGE DERIVED FROM WEATHER RADAR DATA

(75) Inventors: John G. Wilson, West Linn, OR (US); Robert D. Brown, Lake Oswego, OR (US); Khai M. Do, Tigard, OR (US); Nathaniel S. Kowash, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 405 days.

(21) Appl. No.: 13/247,742

(22) Filed: Sep. 28, 2011

(51) Int. Cl.
*G01S 13/94* (2006.01)
*G01S 13/95* (2006.01)
*G01S 13/93* (2006.01)

(52) U.S. Cl.
CPC ............ *G01S 13/953* (2013.01); *G01S 13/9303* (2013.01)
USPC ............................ 342/26 B; 342/65; 342/176

(58) Field of Classification Search
CPC ..................................................... G01S 13/953
USPC ................. 342/26 R–26 D, 176, 191
See application file for complete search history.

(56) References Cited

U.S. PATENT DOCUMENTS

| | | | |
|---|---|---|---|
| 4,914,436 A | 4/1990 | Bateman et al. | |
| 5,047,779 A | 9/1991 | Hager | |
| 5,839,080 A | 11/1998 | Muller et al. | |
| 5,920,276 A | 7/1999 | Frederick | |
| 5,945,926 A | 8/1999 | Ammar et al. | |
| 5,978,715 A | 11/1999 | Briffe et al. | |
| 6,064,942 A | 5/2000 | Johnson et al. | |
| 6,092,009 A | 7/2000 | Glover | |
| 6,112,141 A | 8/2000 | Briffe et al. | |
| 6,122,570 A | 9/2000 | Muller et al. | |
| 6,128,553 A | 10/2000 | Gordon et al. | |
| 6,138,060 A | 10/2000 | Conner et al. | |
| 6,150,901 A | 11/2000 | Auken | |
| 6,154,151 A | 11/2000 | McElreath et al. | |
| 6,163,021 A | 12/2000 | Mickelson | |
| 6,166,661 A | 12/2000 | Anderson et al. | |
| 6,169,770 B1 | 1/2001 | Henely | |
| 6,178,391 B1 | 1/2001 | Anderson et al. | |
| 6,194,980 B1 | 2/2001 | Thon | |
| 6,199,008 B1 * | 3/2001 | Aratow et al. | ................. 701/120 |

(Continued)

FOREIGN PATENT DOCUMENTS

DE 196 49 838 4/1998

OTHER PUBLICATIONS

Fountain, J.R., "Digital Terrain Systems," Airborne Navigation Systems Workshop (Digest No. 1997/169), IEE Colloquium, pp. 4/1-4/6, Feb. 21, 1997.

(Continued)

*Primary Examiner* — John B Sotomayor
*Assistant Examiner* — Marcus Windrich
(74) *Attorney, Agent, or Firm* — Donna P. Suchy; Daniel M. Barbieri

(57) ABSTRACT

An apparatus is for use with an aircraft radar system having a radar antenna. The apparatus comprises processing electronics configured to provide image data associated with an image associated with radar return data from the radar system. The radar return data is updated at a first frequency. The processing electronics are configured to update the image data at a second frequency greater than the first frequency.

20 Claims, 5 Drawing Sheets

(56) References Cited

U.S. PATENT DOCUMENTS

| | | |
|---|---|---|
| 6,201,494 B1 | 3/2001 | Kronfeld |
| 6,219,592 B1 | 4/2001 | Muller et al. |
| 6,233,522 B1 | 5/2001 | Morici |
| 6,259,400 B1 | 7/2001 | Higgins et al. |
| 6,266,114 B1 | 7/2001 | Skarohlid |
| 6,281,832 B1 | 8/2001 | McElreath |
| 6,285,298 B1 | 9/2001 | Gordon |
| 6,285,337 B1 | 9/2001 | West et al. |
| 6,285,926 B1 | 9/2001 | Weiler et al. |
| 6,289,277 B1 | 9/2001 | Feuereisen et al. |
| 6,311,108 B1 | 10/2001 | Ammar et al. |
| 6,317,468 B1 | 11/2001 | Meyer |
| 6,345,127 B1 | 2/2002 | Mitchell |
| 6,377,892 B1 | 4/2002 | Johnson et al. |
| 6,388,607 B1 | 5/2002 | Woodell |
| 6,388,608 B1 | 5/2002 | Woodell et al. |
| 6,411,890 B1 | 6/2002 | Zimmerman |
| 6,421,603 B1 | 7/2002 | Pratt et al. |
| 6,424,288 B1 | 7/2002 | Woodell |
| 6,426,717 B1 | 7/2002 | Maloratsky |
| 6,441,773 B1 | 8/2002 | Kelly et al. |
| 6,448,922 B1 | 9/2002 | Kelly |
| 6,452,511 B1 | 9/2002 | Kelly et al. |
| 6,456,236 B1 | 9/2002 | Hauck et al. |
| 6,473,240 B1 | 10/2002 | Dehmlow |
| 6,492,934 B1 | 12/2002 | Hwang et al. |
| 6,501,424 B1 | 12/2002 | Haendel et al. |
| 6,512,476 B1 | 1/2003 | Woodell |
| 6,525,674 B1 | 2/2003 | Kelly et al. |
| 6,531,669 B1 | 3/2003 | Miller et al. |
| 6,549,161 B1 | 4/2003 | Woodell |
| 6,567,728 B1 | 5/2003 | Kelly et al. |
| 6,574,030 B1 | 6/2003 | Mosier |
| 6,577,947 B1 | 6/2003 | Kronfeld et al. |
| 6,591,171 B1* | 7/2003 | Ammar et al. ............... 701/16 |
| 6,603,425 B1 | 8/2003 | Woodell |
| 6,650,275 B1 | 11/2003 | Kelly et al. |
| 6,653,947 B2 | 11/2003 | Dwyer et al. |
| 6,667,710 B2* | 12/2003 | Cornell et al. ............. 342/26 R |
| 6,690,298 B1 | 2/2004 | Barber et al. |
| 6,690,299 B1 | 2/2004 | Suiter |
| 6,714,186 B1 | 3/2004 | Mosier et al. |
| 6,741,203 B1 | 5/2004 | Woodell |
| 6,741,208 B1 | 5/2004 | West et al. |
| 6,744,382 B1 | 6/2004 | Lapis et al. |
| 6,744,408 B1 | 6/2004 | Stockmaster |
| 6,757,624 B1 | 6/2004 | Hwang et al. |
| 6,771,626 B1 | 8/2004 | Golubiewski et al. |
| 6,804,614 B1 | 10/2004 | McGraw et al. |
| 6,806,846 B1 | 10/2004 | West |
| 6,819,983 B1 | 11/2004 | McGraw |
| 6,822,617 B1 | 11/2004 | Mather et al. |
| 6,839,017 B1 | 1/2005 | Dillman |
| 6,850,185 B1 | 2/2005 | Woodell |
| 6,862,501 B2 | 3/2005 | He |
| 6,865,452 B2 | 3/2005 | Burdon |
| 6,879,280 B1 | 4/2005 | Bull et al. |
| 6,882,302 B1 | 4/2005 | Woodell et al. |
| 6,918,134 B1 | 7/2005 | Sherlock et al. |
| 6,950,062 B1 | 9/2005 | Mather et al. |
| 6,972,727 B1 | 12/2005 | West et al. |
| 6,977,608 B1 | 12/2005 | Anderson et al. |
| 6,992,614 B1 | 1/2006 | Joyce |
| 6,995,726 B1 | 2/2006 | West et al. |
| 6,998,908 B1 | 2/2006 | Sternowski |
| 6,999,022 B1 | 2/2006 | Vesel et al. |
| 7,002,546 B1 | 2/2006 | Stuppi et al. |
| 7,034,753 B1 | 4/2006 | Elsallal et al. |
| 7,042,387 B2* | 5/2006 | Ridenour et al. ........... 342/26 B |
| 7,064,680 B2 | 6/2006 | Reynolds et al. |
| 7,089,092 B1 | 8/2006 | Wood et al. |
| 7,092,645 B1 | 8/2006 | Sternowski |
| 7,109,912 B1 | 9/2006 | Paramore et al. |
| 7,109,913 B1 | 9/2006 | Paramore et al. |
| 7,129,885 B1 | 10/2006 | Woodell et al. |
| 7,145,501 B1 | 12/2006 | Manfred et al. |
| 7,148,816 B1 | 12/2006 | Carrico |
| 7,151,507 B1 | 12/2006 | Herting |
| 7,158,072 B1 | 1/2007 | Venkatachalam et al. |
| 7,161,525 B1 | 1/2007 | Finley et al. |
| 7,170,446 B1 | 1/2007 | West et al. |
| 7,196,329 B1 | 3/2007 | Wood et al. |
| 7,205,933 B1 | 4/2007 | Snodgrass |
| 7,209,070 B2* | 4/2007 | Gilliland et al. ............ 342/26 B |
| 7,219,011 B1 | 5/2007 | Barber |
| 7,242,343 B1 | 7/2007 | Woodell |
| 7,272,472 B1 | 9/2007 | McElreath |
| 7,292,178 B1 | 11/2007 | Woodell et al. |
| 7,312,725 B2 | 12/2007 | Berson et al. |
| 7,312,743 B2 | 12/2007 | Ridenour et al. |
| 7,486,291 B2 | 2/2009 | Berson et al. |
| 7,525,448 B1* | 4/2009 | Wilson et al. ................. 340/971 |
| 7,570,177 B2 | 8/2009 | Reynolds et al. |
| 7,633,430 B1 | 12/2009 | Wichgers et al. |
| 7,639,175 B1 | 12/2009 | Woodell |
| 7,664,601 B2* | 2/2010 | Daly, Jr. ........................... 702/3 |
| 7,675,461 B1 | 3/2010 | McCusker et al. |
| 7,733,264 B1 | 6/2010 | Woodell et al. |
| 7,783,427 B1 | 8/2010 | Woodell et al. |
| 7,859,448 B1 | 12/2010 | Woodell et al. |
| 7,859,449 B1 | 12/2010 | Woodell et al. |
| 8,035,547 B1* | 10/2011 | Flanigan et al. ................ 342/36 |
| 8,373,580 B2* | 2/2013 | Bunch et al. .................. 340/971 |
| 8,493,241 B2* | 7/2013 | He .................................. 340/977 |
| 2002/0185600 A1 | 12/2002 | Kerr |
| 2003/0071828 A1 | 4/2003 | Wilkins et al. |
| 2003/0216859 A1 | 11/2003 | Martell et al. |
| 2004/0044445 A1 | 3/2004 | Burdon |
| 2004/0059473 A1 | 3/2004 | He |
| 2004/0083038 A1 | 4/2004 | He |
| 2004/0181318 A1 | 9/2004 | Redmond et al. |
| 2005/0174350 A1 | 8/2005 | Ridenour et al. |
| 2006/0097895 A1 | 5/2006 | Reynolds et al. |
| 2006/0227012 A1 | 10/2006 | He |
| 2006/0290531 A1 | 12/2006 | Reynolds et al. |
| 2007/0060063 A1 | 3/2007 | Wright et al. |
| 2008/0180351 A1 | 7/2008 | He |
| 2009/0207048 A1 | 8/2009 | He et al. |
| 2010/0033499 A1 | 2/2010 | Gannon et al. |
| 2011/0282580 A1* | 11/2011 | Mohan ......................... 701/216 |

OTHER PUBLICATIONS

Johnson, A., et al., Vision Guided Landing of an Autonomous Helicopter in Hazardous Terrain, Robotics and Automation, 2005. ICRA 2005. Proceedings of the 2005 IEEE International Conference, pp. 3966-3971, Apr. 18-22, 2005.

Technical Standard Order, TSO-C115b, Airborne Area Navigation Equipment Using Multi-Sensor Inputs, Sep. 30, 1994, 11 pages, Department of Transportation, Federal Aviation Administration, Washington, DC.

Office Action for U.S. Appl. No. 11/851,323, mail date Aug. 6, 2009, 23 pages.

Office Action for U.S. Appl. No. 11/851,323, mail date Dec. 15, 2010, 13 pages.

Vadlamani, A., et al., Improving the detection capability of spatial failure modes using downward-looking sensors in terrain database integrity monitors, Digital Avionics Systems Conference, 2003. DASC-03. The 22nd, vol. 2, pp. 9.C.5-1-9.C.5-12, Oct. 12-16, 2003.

Honeywell, RDR-4B Forward looking windshear detection / weather radar system user's manual with radar operating guidelines, Rev. 6, Jul. 2003, 106 pages.

Kuntman, D., Airborne system to address leading cause of injuries in non-fatal airline accidents, ICAO Journal, Mar. 2000, 4 pages.

Office Action for U.S. Appl. No. 11/851,323, mail date Jul. 5, 2012, 23 pages.

Office Action on U.S. Appl. No. 13/241,051 Dated Feb. 27, 2014, 21 pages.

* cited by examiner

SYSTEM FOR AND METHOD OF DISPLAYING AN IMAGE DERIVED FROM WEATHER RADAR DATA

CROSS-REFERENCE TO RELATED PATENT APPLICATIONS

The present application is related to application Ser. No. 11/851,323 filed on Sep. 6, 2007 and Ser. No. 11/904,491 filed on Sep. 26, 2007, both of which are herein incorporated by reference in their entireties. The present application is also related to: U.S. patent application Ser. No. 13/241,051, entitled "DUAL THREADED SYSTEM FOR LOW VISIBILITY OPERATIONS" by Tiana et al. ('780), U.S. patent application Ser. No. 12/263,282 entitled "SYSTEM AND METHOD FOR GROUND NAVIGATION" by McCusker et al. ('568) and U.S. patent application Ser. No. 12/180,293 entitled "SYSTEM AND METHOD FOR AIRCRAFT ALTITUDE MEASUREMENT USING RADAR AND KNOWN RUNWAY POSITION" by Woodell et al. ('550), all of which are herein incorporated by reference in their entirety and assigned to the assignees of the present application.

BACKGROUND

The present disclosure relates generally to weather radar data. The disclosure more specifically relates to an apparatus and method for display of weather data.

Displays are used in head down display (HDD) systems, head up display (HUD) systems and wearable displays, such as, helmet mounted display (HMD) systems. In aircraft applications, HUD, HDD and HMD systems advantageously display information from aircraft systems and sensors in a graphical and alphanumeric format. The display information can include an enhanced vision image from a camera or other imaging sensor (such as a visible light imaging sensor, infrared imaging sensor, millimeter wave radar imager, etc.) and/or a synthetic vision image from a synthetic vision computer in certain applications. The enhanced vision image can be merged with a synthetic vision image to provide a single image to the pilot.

Enhanced vision systems have certain disadvantages. For example, enhanced vision systems add extra weight and cost to the aircraft. In addition, enhanced vision images are not always able to sense objects or terrain through all types of weather and require a noticeable bump in the nose of the aircraft where a camera or other sensor is installed.

FAA-certified enhanced flight vision systems can allow pilots landing under instrument flight rules to operate below certain specified altitudes during instrument approaches even when the airport environment is not visible. Conventional SVS cannot provide enhanced flight visibility, especially the capability to show a real-time image of an aircraft, vehicle or other obstacle on the runway during an impending landing. Although SVS has been approved for flying an instrument approach procedure, SVS has not been approved for operations below authorized decision height (DH) or minimum descent altitude (MDA). The use of an integrity monitor for a SVS may allow for higher design assurance levels which could lead to the use of monitored SVS for lower landing minimum credit (e.g., would allow a pilot with a monitored SVS display system to land where a non-monitored SVS pilot would not be otherwise allowed to land due to the current low visibility runway visible range (RVR) restrictions). Accordingly, there have been proposals to provide a monitor for an SVS system based upon various instruments. The use of additional equipment to provide an integrity monitor for the SVS can add to the cost and weight of the aircraft.

Weather radar systems can provide images of an environment outside the aircraft. However, such images are only available after a radar sweep is completed which can require a significant period of time. Accordingly, images from weather radar systems are not conventionally used to replace real time images from EVS.

Accordingly, there is a need for systems for and methods of displaying images derived from weather data. There is still a further need for systems for and methods of providing real time images derived from weather data. Yet further, there is a need for a HUD including a merged SVS image and a real time image derived from weather radar data or providing a real time image derived from weather radar data. There is also a need for a system for and method of providing an integrity check for an SVS without use of additional systems. There is also a need for systems for and methods of providing integration of a synthetic image and an image based upon weather data.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One embodiment of the disclosure relates to an apparatus for use with an aircraft weather radar system having a radar antenna. The apparatus comprises processing electronics configured to provide image data associated with an image associated with radar return data from the weather radar system. The radar return data is updated at a first frequency. The processing electronics are configured to update the image data at a second frequency greater than the first frequency.

The image data can be used instead of data from an enhanced vision sensor in one embodiment. In one embodiment, a weather radar system can replace the need for an enhanced vision sensor.

Another embodiment of the disclosure relates to a method of displaying a terrain image on an electronic display using radar return data from a weather radar system on an aircraft. The method comprises receiving the radar return data from the weather radar system at a first time, and providing image data in response to the radar return data. The method also includes adjusting the image data in accordance with aircraft movement between the first time and a second time, and displaying the terrain image in response to the image data.

A further embodiment of the disclosure relates to an apparatus for use with a weather radar system. The apparatus comprises means for generating a first frame from weather radar data from the weather radar system, and means for providing a second frame based upon the first frame. The first frame being representative of terrain sensed by the weather radar system. The second frame is provided in accordance with movement of the aircraft from a time of reception of weather radar data.

BRIEF DESCRIPTION OF THE DRAWINGS

The disclosure will become more fully understood from the following detailed description, taken in conjunction with the accompanying drawings.

DETAILED DESCRIPTION OF THE EXEMPLARY EMBODIMENTS

Figure 1:
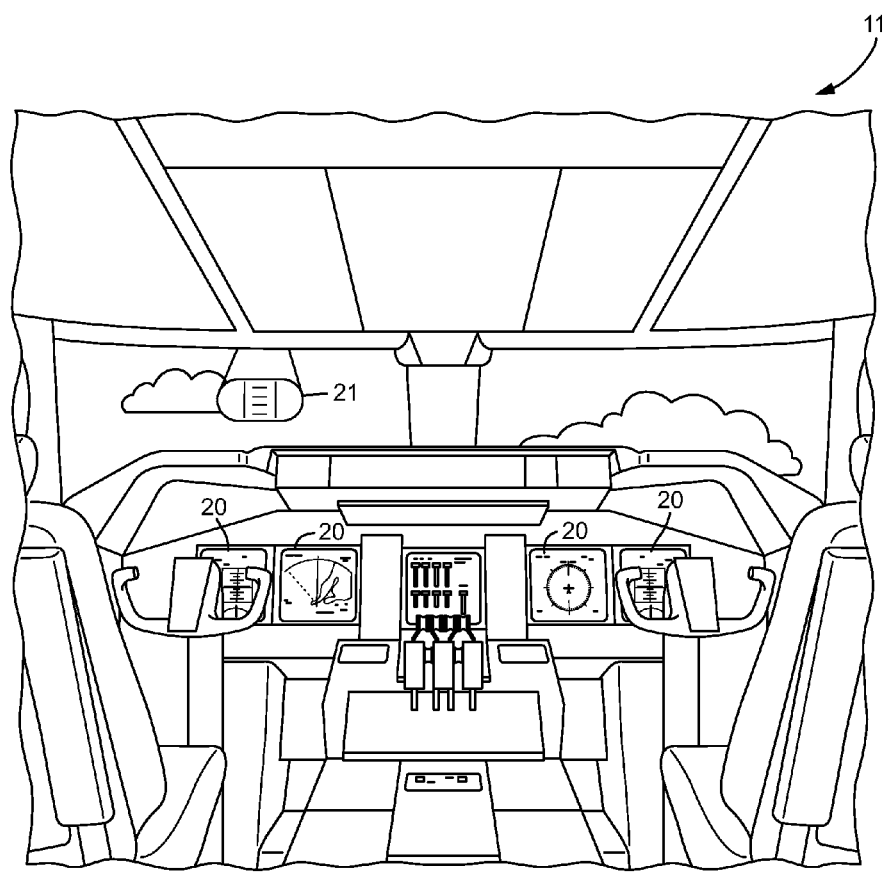
FIG. 1 is a schematic illustration of an aircraft control center or cockpit, according to an exemplary embodiment.

Before describing in detail the particular improved system and method, it should be observed that the invention includes, but is not limited to, a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring to FIG. 1, an illustration of an aircraft control center or cockpit 11 is shown, according to one exemplary embodiment. Aircraft control center 11 includes flight displays 20 embodied as head down displays (HDDs). Aircraft control center 11 can also include a combiner 21 association with a head up display (HUD) system.

Flight displays 20 can be used to provide information to the flight crew, thereby increasing visual range and enhancing decision-making abilities. In an exemplary embodiment, flight displays 20 and combiner 21 can include a weather display, a joint display, a weather radar map and a terrain display. Further, flight displays 20 may include images from a synthetic vision system (SVS). For example, flight displays 20 can include a display configured to display a three dimensional perspective image of terrain and/or weather information. Other view of terrain and/or weather information may also be provided (e.g. plan view, horizontal view, vertical view, etc.). Additionally, flight displays 20 can be implemented using any of a variety of display technologies, including CRT, LCD, organic LED, dot matrix display, and others. Aircraft control center 11 preferably includes a combiner 21 associated with a head up display system. Conformal images are provided on combiner 21. Center 11 can also include worn displays, such as helmet mounted displays (HMD), etc.

According to an exemplary embodiment, at least one of displays 20 or combiner 21 is configured to provide an image of terrain derived from weather data. In one embodiment, at least one of displays 20 or combiner 21 displays a merged image of terrain derived from radar data and SVS data. Advantageously, the data from the radar data is updated at a greater frequency than it is received to provide a real time rendition of the image derived from radar data in one embodiment. The updated data also advantageously allows matching and/or merging with the SVS data which is provided at a faster rate than the radar data in one embodiment.

Flight displays 20 and/or combiner 21 can be configured to provide an indication to a flight crew as to whether the terrain features associated with the radar data and SVS data displayed on the electronic display are correct or incorrect. In one embodiment, such an indication notifies the crew if the integrity of the SVS is sufficient, possibly for lower authorized decision heights and minimum descent altitudes in low visibility conditions.

Figure 2:
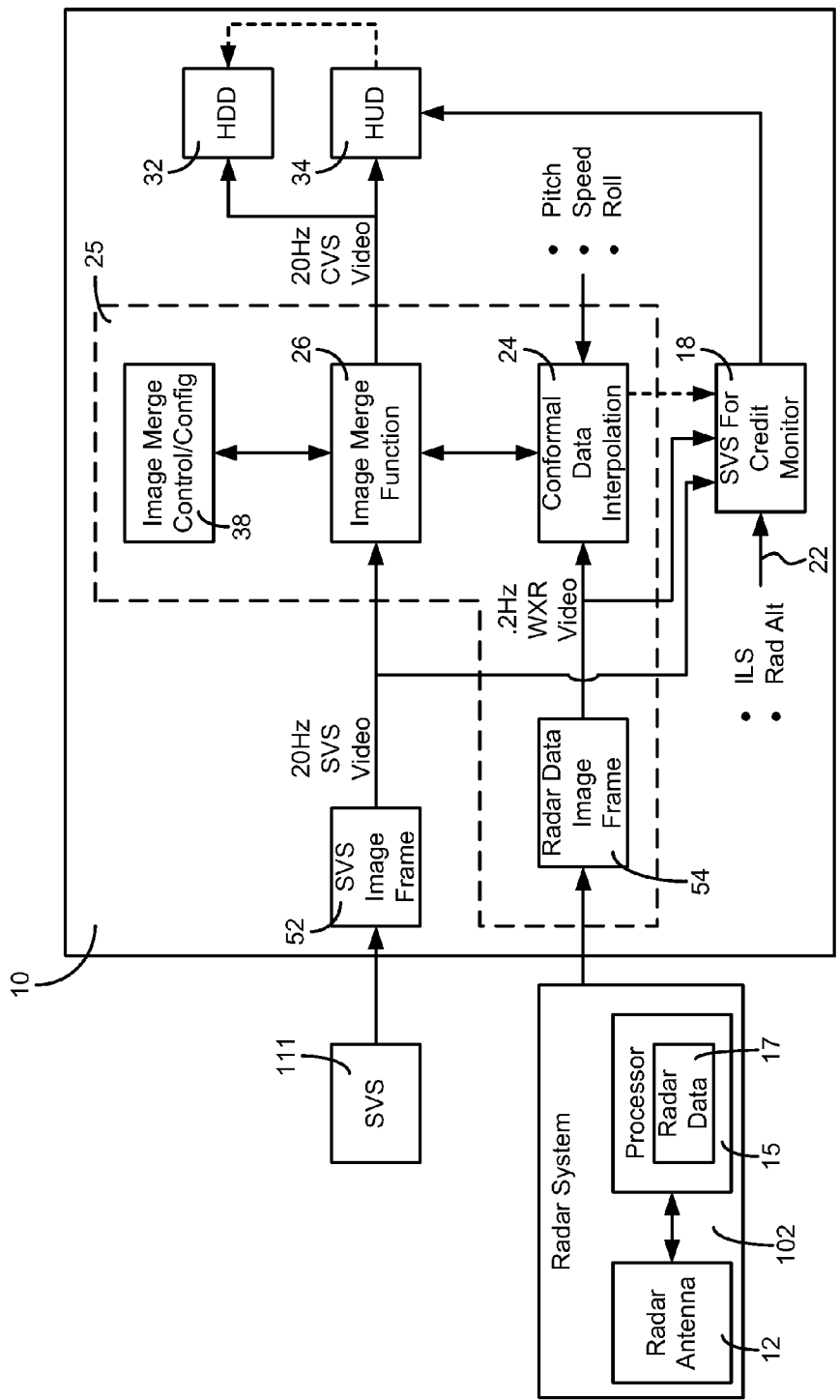
FIG. 2 is a schematic general block diagram of a display system for displaying an image derived from radar data, according to an exemplary embodiment.

Referring to FIG. 2, display system 10 can be utilized for providing an image to any of displays 20 or combiner 21. Display system 10 is in communication with a radar system 102 and a synthetic vision system (SVS) 111.

Radar system 102 is preferably a weather radar system generally located inside the nose of the aircraft, inside a cockpit of the aircraft, on the top of the aircraft or on the tail of the aircraft. Radar system 102 can include a radar antenna 12 and a processor 15. Radar system 102 is preferably a weather radar system, such as, a Multiscan™ radar system from Rockwell Collins, Inc. Radar system 102 can utilize a split or half aperture or other technique for obtaining radar data associated with terrain in one embodiment. The type of radar system 102 and data gathering techniques are not discussed in a limiting fashion.

Radar system 102 preferably includes a computer system or processor 15 including radar data 17. Processor 15 receives radar returns (e.g., weather radar returns data) from radar antenna 12, processes the radar returns and provides data stored in radar data 17. The data stored in memory preferably includes an image frame representing terrain.

Display system 10 preferably includes a memory 54 for receiving an image frame derived from radar data 17 and a memory 52 for receiving an image frame from SVS 111. Alternatively, the radar return data can be directly communicated to system 10, and system 10 can provide the image frame derived from radar data in memory 54. In one embodiment, system 10 includes a processor 25 coupled to a head down display (HDD) 32 and a head up display (HUD) 34. HUD 34 can include a HUD computer, projector and combiner 21 (FIG. 1).

Processor 25 includes an image merge control configuration module 38, an image merge function module 26, and a conformal data interpolation module 24. Modules 24, 26, and 38 can be implemented in software and can be executed on a computing platform including processor 25. Modules 24, 26, and 38 can be stored on a non-transitory medium.

According to one embodiment, the conformal data interpolation module 24 adjusts the frame from weather radar data in accordance with updated real time movement of the aircraft derived from sensors. According to one embodiment, the frame associated with terrain sensed by the radar system 102 is rotated and/or translated in accordance with aircraft position data (e.g., pitch, roll, speed, etc.) multiple times per second (e.g., at 20 Hz) to interpolate a single five second terrain data radar sweep (frame) and compute a frame in each real time 20 Hz video frame that is merged with the real time SVS video frame.

System 10 can also include a SVS for credit monitor 18 in one embodiment. SVS for credit monitor 18 can receive signals from various aircraft sensors including integrated landing system (ILS), radio altimeters, an inertial navigation system (INS) and/or other sensors. Monitor 18 can provide an indication of the result of an integrity check for display on HDD 32 and HUD 34.

Radar system 102 is preferably a weather radar system and provides weather radar data to form an image of terrain derived from the weather radar data for reception by memory 54. System 102 can provide the frame or data for the image in radar data 15 and communicate it to memory 54. Alternatively, processor 25 can build the frame or image based upon radar return data from system 102. Similarly, SVS 111 can provide data or a frame for SVS image received by memory 52. Alternatively, system 10 can provide the data or image frame to memory 52 in response to data from SVS 111.

In one embodiment, system 102 preferably provides data representing a 120 degree field of view in accordance with a weather radar sweep which takes approximately five seconds to complete in one embodiment. The sweep can be limited during approach to be a 30 degree sweep which requires five seconds before new data is available for display in certain embodiments. The sweep is directed toward the surface of the Earth so that returns are obtained which allow a terrain image to be created. Various types of sweeps, scans and timings of sweeps and scans can be utilized without departing from the scope of the invention.

According to one embodiment, SVS 111 can be any electronic system or device for providing a computer generated image of the external scene topography. The image can be from the perspective of the aircraft flight deck as derived from aircraft attitude, high-precision navigation solutions, and a database of terrain, obstacles and relevant cultural features. Generally, only those terrain, obstacle, and runway features which are contained in the current version of the SVS database are displayed in a conventional system. The pilot uses the synthetic vision images as enhancements to available visual cues.

Preferably, system 10 combines or fuses images from SVS 111 and the images derived from radar data from system 102 to optimize the overall image provided to the pilot according to one embodiment. Preferably, the images are fused in a format that utilizes the best features of SVS 111 and the images from radar data from system 102.

SVS 111 can be comprised in part of terrain database and a processor according to one exemplary embodiment. The terrain database can be used to create a three-dimensional perspective of the scene in front of the aircraft on a two-dimensional display or a three dimensional display. The database can employ topographical colors similar to those depicted on standard aeronautical charts. Furthermore, the database is capable of detecting segments of image data corresponding to various objects in the computer generated image such as runways, terrain and sky.

SVS 111 can also receive aircraft position data from an aircraft data source, such as, the source used by module 24 or other equipment. The aircraft data source can include any system or sensor (or combination thereof) that provides navigation data or aircraft flight parameters. For example, a typical navigation system in an aircraft is comprised of numerous sub-systems. Sub-systems which provide aircraft position data and flight parameter data could include, but are not limited to, an inertial navigation system (INS), a global navigation satellite system (e.g., global positioning system (GPS)), air data sensors, compasses, and a flight management computing system.

In one embodiment, the SVS image frame from SVS 111 is updated at a frequency of 20 Hz. In a preferred embodiment, individual frames of the SVS image are provided every 0.05 seconds and are received in memory 52 or by processor 25. The image frame or data derived from radar returns received by memory 54 is updated at approximately 0.2 Hz in one embodiment. A new image frame or data associated with image is provided to processor 25 or memory 54 every five seconds in one embodiment. The timing provided above is exemplary only. Image frames from SVS 111 and derived from system 102 can be provided at different times, frequencies or rates.

According to one embodiment, the frequency of image frames received by memory 54 is slower than the frequency of image frames received by memory 52. Accordingly, processor 25 using conformal data interpolation module 24 updates the image frame derived from weather radar data. In one embodiment, conformal data interpolation module 24 receives pitch, speed and roll information to update the image frame with respect to new positions of the aircraft.

Figure 3:
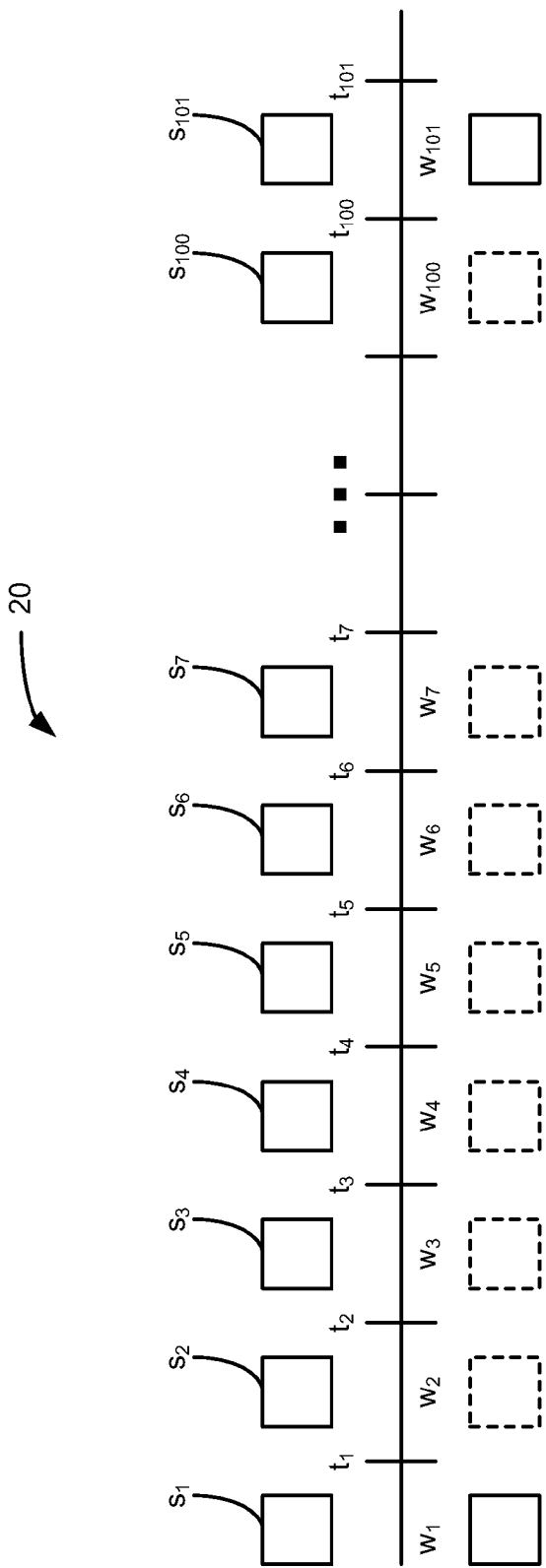
FIG. 3 is a timing diagram showing images derived from radar data and from SVS data for the system illustrated in FIG. 2 according to another exemplary embodiment.

With reference to FIG. 3, an image $w_1$ is received in memory 54 at or before a time $t_1$ and an image $s_1$ is received in memory 52 at or before a time $t_1$. Image $w_1$ and image $s_1$ are provided to image merge function module 26. At or before time $t_2$, interpolation module 24 updates image $w_1$ and provides image $w_2$ to image merge function module 26 while image $s_1$ is replaced with image $s_2$ in memory 52 and provided to image merge function module 26. Image $w_2$ can be stored in memory 54 at or before time $t_2$. At or before time $t_3$, image $w_2$ is updated by data interpolation module 24 to be image $w_3$ while image $s_3$ is received from SVS 111. Images $w_3$ and $s_3$ are provided to image merge function module 26. At or before time $t_4$, image $w_3$ is updated to be image $w_4$ by module 24 and image $s_4$ is received by memory 52 from SVS 111 at time $t_4$. This process of updating continues until a new image $w_{101}$ is received at a time $t_{101}$ from radar system 102 and another cycle of updates begins.

As shown in FIG. 3, image $w_1$ is updated 100 times before a new image (e.g., image $w_{101}$) derived from weather data is provided by system 102. During this time, SVS 111 has provided 100 new images $s_1$ to $s_{100}$ to memory 52. In one embodiment, the time between $t_1$ and $t_2$ and each successive interval is 0.05 seconds. In one embodiment, the time between $t_1$ and $t_{100}$ is 5 seconds.

Accordingly, conformal data interpolation module 24 can update the output of radar system 102 to temporally match the output of SVS 111 on an image-for-image basis in one embodiment. Alternatively, other update ratios can be utilized. For example, updates by module 24 can occur at half the rate, or one quarter of the rate, that images from SVS 111 are received. The timing shown on FIG. 3 is exemplary only.

The updated images $w_2$-$w_{100}$ are provided from conformal data interpolation module 24 to image merge function module 26 where updated images $w_{2-100}$ are merged with images $s_{2-100}$ from SVS 111. The merged images are displayed on displays 20 and/or combiner 21. Advantageously, updated images $w_{2-100}$ derived from radar data allow EVS functionality to be replaced such that the images $w_{1-101}$ derived from radar data can effectively be used in a credit monitor 18 for HUD 34, thereby allowing the use of lower landing minima in SVS 111 without EVS according to one embodiment. Further, applicants have found that images $w_1$-$w_{101}$ derived from weather radar data can effectively see through weather conditions, thereby providing an effective real time sensor of the outside environment.

Figure 5:
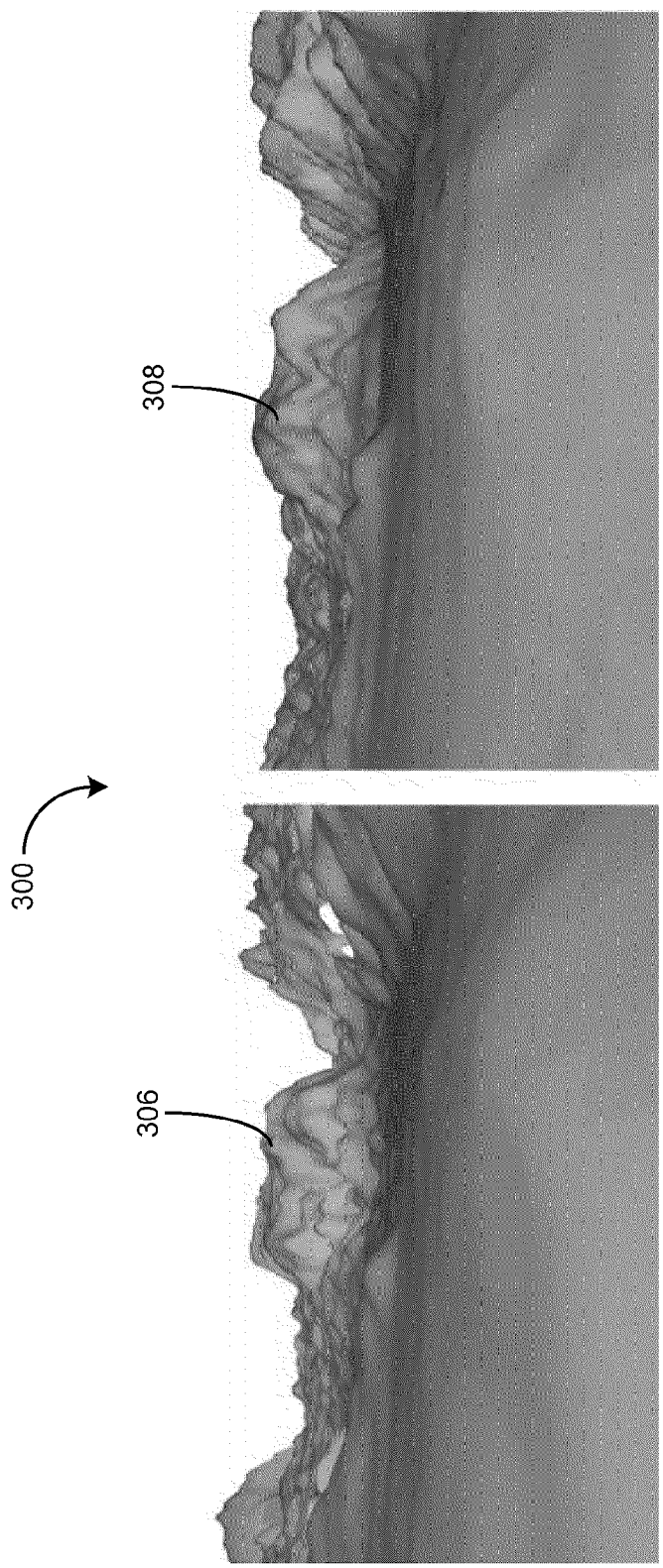
FIG. 5 is an illustration of a synthetic vision system terrain image and a terrain image derived from radar data.

With reference to FIG. 5, the data in the terrain database of SVS 111 can be compared to an image derived from radar data from system 102 to confirm accuracy. An image 300 includes a portion 306 showing an image of terrain derived from radar data and a portion 308 showing an image of the same terrain from on SVS database. The terrain is viewed from the perspective of an aircraft on approach to a runway in one embodiment. The terrain data and accuracy of SVS 111 can be monitored by comparing images $s_1$-$s_{101}$ to images $w_1$-$w_{101}$. As shown by image 300, there is a close correlation between portions 306 from system 102 and portion 306 from SVS 111 when under property working conditions.

Various matching algorithms can be utilized to determine if the SVS data images $s_1$ and $s_{101}$ is accurate when compared to the real time data image $w_1$ and $w_{101}$ provided by system 102. In one embodiment, monitor 18 only receives images $w_1$ and $w_{101}$ from system 102 as opposed to updated images $w_{2-100}$. (e.g., only images $w_1$, $w_{101}$, . . . etc. are compared to images $s_1$, $s_{101}$, . . . ).

The compare function generally looks for specific terrain features (peaks and valleys) and performs such comparisons on a regular, repeated, periodic schedule (e.g., every couple of seconds). In one embodiment, terrain features, such as runways, can be matched. Runways are readily ascertainable from radar data. If the compare function indicates that there is not a match, a monitor 18 indicates that lower minimum approaches are not to be allowed as there may be a database error or error with system 102 or SVS 111. The indication can be provided on combiner 21 associated with HUD 34 or on displays 20.

Applicants believe that use of monitor 18 and system 10 may allow for a reduction of minimum from a 200 foot decision height to a 100 foot. An additional benefit of the system may also be for use in low visibility taxi scenarios.

Figure 4:
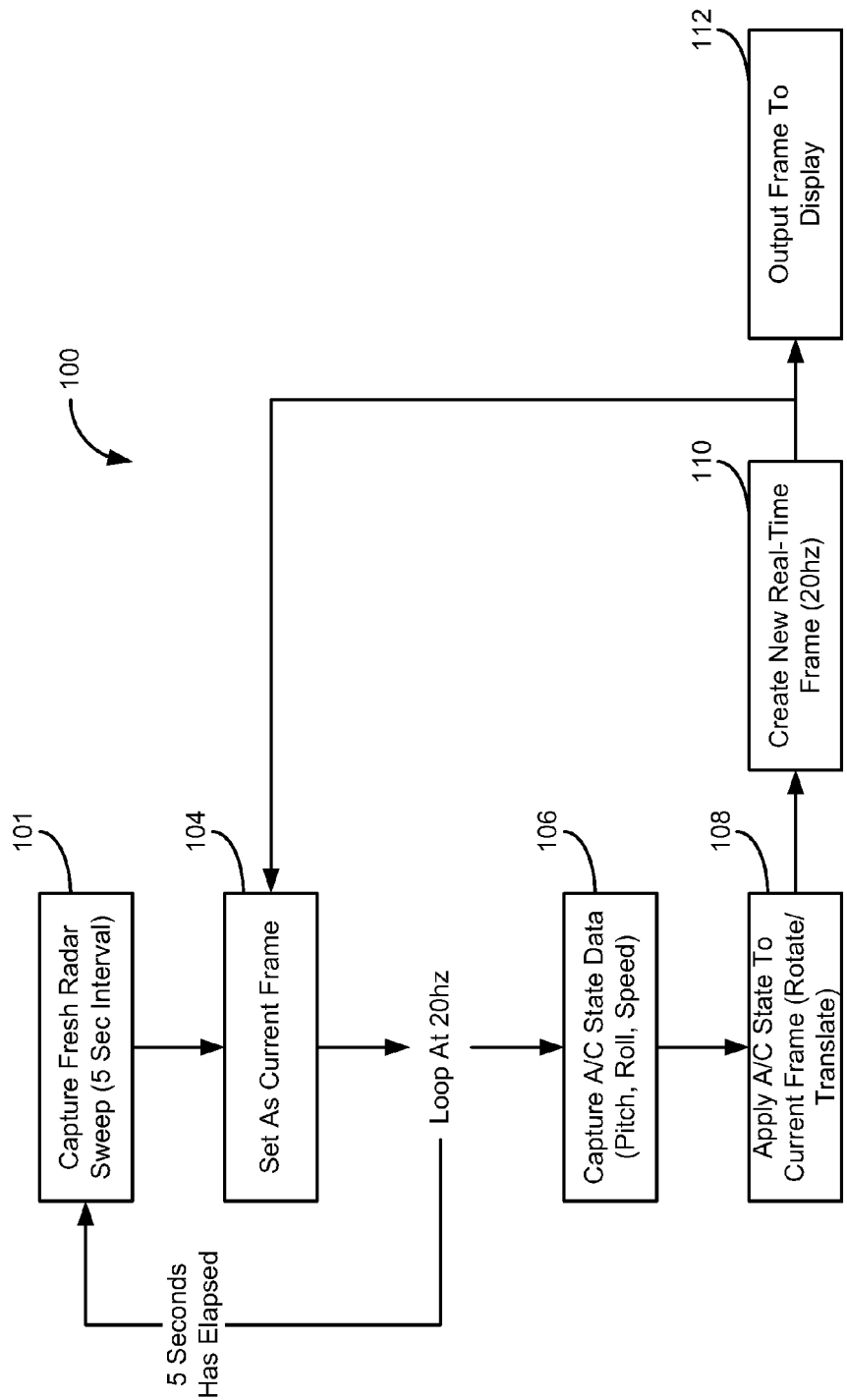
FIG. 4 is a flow diagram showing an exemplary process used by the system illustrated in FIG. 2, according to a further exemplary embodiment.

With reference to FIG. 4, process 100 can be operated by processor 15 and conformal data interpolation module 24 to provide frames $w_1$-$w_{101}$. Weather radar data from system 102 is captured at a step 101 at memory and set as current frame 104 (e.g., $w_1$). At a step 106, the appropriate aircraft state data (pitch, roll, speed, etc.) is captured. At a step 108, the aircraft state is applied to the current frame received at step 104 and a new adjusted frame (e.g., $w_2$) is created at step 110. The adjusted frame is output to HDD 32, HUD 34 or both at a step 112. At a step 104, that frame is set as the current frame.

Steps 104, 106, 108, 110 and 112 are performed in a loop at 20 Hz in one embodiment. Steps 102 and 104 performed in a loop at 0.2 Hz according to one embodiment.

A new frame (e.g., $w_{101}$) is captured at step 101. The frame captured at step 101 is set as a current frame and the frame (e.g., $w_{100}$) created at step 110 is discarded.

In one embodiment, differences in the frame provided at step 110 and provided at step 104 can be highlighted for the pilot. Such differences may be an indication of weather changes or traffic changes.

Image control configuration module 38 can provide format adjustments to data. SVS 111 and the system 102 can have their own specific interface type and format. Also, each display or displays 20 or combiner 21 may require specific formatting. A standard format can be a format used in HUD processing functions. Module 38 can be implemented in hardware, software, or combinations thereof.

Processor 25 preferably executes a fusion processing algorithm in module 26. The frames from SVSs 111 can be provided as a video signal and the updated frames from system 120 can be provided as a video signal for fusion processing.

In one embodiment, the fusion processing algorithm fuses the frames from memory 52 and 54 provided as video signals. This fusion process may include special formatting (positioning, sizing, cropping, etc.) of specific features or the entire image from a specific image source based on other sensor inputs or aircraft. After the combined or fused image has been completed, the entire image is sized to fit appropriately within the total HUD field-of-view and conformally overlay the outside scene which is viewed through the HUD. In addition, the overall fused image contrast is standardized with the brightness/contrast to support the brightness/contrast controls of the HUD. Alternatively, images $w_{1-100}$ can be presented on displays 20 and combiner 21 without merging with images $s_{1-101}$.

Processor 25 can be any hardware and/or software processor or processing architecture capable of executing instructions and operating on navigational data. Processor 25 can be capable of determining navigational information such as altitude, heading, bearing, and location based on data from aircraft sensors. Applicants note that process 100 and conformal data interpolation can be performed in various equipment on the aircraft including in a HUD computer, a display processor, radar system 102, a navigation system, SVS 111 etc.

Radar system 102 can also be used to detect weather patterns in the vicinity of the aircraft. Further, radar system 102 can provide weather related information on combiner 21 or displays 20.

While the detailed drawings, specific examples, detailed algorithms, and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. For example, the scope of the claims are intended to cover any technique that uses a selectable fractional aperture unless literally delineated from the claims. Furthermore, other substitutions, modifications, changes, and omissions may be made in the design, operating conditions, and arrangement of the exemplary embodiments without departing from the scope of the invention as expressed in the appended claims.

What is claimed is:

1. An apparatus for use with an aircraft radar system of an aircraft having a radar antenna, the apparatus comprising:
a display and processing electronics comprising an image merge module and a data interpolation module and configured to: (1) provide first image data associated with radar return data from the radar system, the first image data representing terrain, the radar return data being updated at a first frequency; (2) receive second image data representing the terrain and associated with a synthetic image system at a second frequency greater than the first frequency; (3) perform conformal interpolation of the first image data with respect to position of the aircraft at the second frequency to provide interpolated image data; (4) merge the second data and the interpolated image data at the second frequency to provide merged image data indicative of at least one image associated with the interpolated image data and at least one image associated with the second image data; and (5) provide the merged image data to cause the display to display a merged terrain image associated with the merged image data, the merged image data being provided at the second frequency.

2. The apparatus of claim 1, wherein the processing electronics are further configured to update the interpolated image data according to movements of the aircraft between a last reception of the radar data and a present time.

3. The apparatus of claim 2, wherein the movements of the aircraft include roll, pitch and location changes.

4. The apparatus of claim 1, wherein the merged image data is used to provide a merged image for replacing an EVS image or a need for an EVS.

5. The apparatus of claim 1, wherein the radar system is a weather radar system.

6. The apparatus of claim 5, wherein the merged terrain image associated with the merged image data is conformally provided onto a combiner of a head up display system.

7. The apparatus of claim 1, wherein the processing electronics are further configured to: receive a velocity parameter, and update the interpolated image data in response to the velocity parameter.

8. The apparatus of claim 1, wherein the second image data is associated with an SVS image.

9. The apparatus of claim 1, wherein the first frequency is less than 0.3 Hz and the second frequency is greater than 10 Hz.

10. The apparatus of claim 8, wherein the first frequency is less than or equal to 0.2 Hz and the second frequency is greater than or equal to 20 Hz.

11. The apparatus of claim 1, wherein the interpolated image data is merged with SVS data wherein the SVS data is updated at a frequency greater than or equal to 20 Hz.

12. A method of displaying a terrain image on an electronic display using radar return data from a radar system on an aircraft, the method comprising:
- receiving the radar return data from the radar system at a first time;
- providing first image data related to terrain in response to the radar return data at the first time;
- adjusting the first image data in accordance with aircraft movement between the first time and a second time to provide first adjusted image data;
- receiving first terrain data from a terrain data base associated with an aircraft position at the second time;
- merging the first adjusted image data and the first terrain data to provide first merged image data for a first terrain image;
- displaying the first terrain image in response to the first merged image data via the electronic display;
- receiving the radar return data from the radar system at a third time;
- providing second image data related to the terrain in response to the radar return data at the third time;
- receiving second terrain data associated with the aircraft position at the third time;
- merging the second terrain data and the second image data to provide second merged data for a second terrain image; and
- displaying the second terrain image in response to the second merged data via the electronic display.

13. The method of claim 12, further comprising:
correlating the radar return data or the first merged image data with the terrain data from a terrain data base.

14. The method of claim 13, further comprising:
using the correlation to enable a lower minimum approach.

15. The method of claim 13, further comprising:
using the correlation to indicate an error.

16. The method of claim 13, further comprising:
merging synthetic vision data and the first adjusted image data.

17. The method of claim 12, wherein the electronic display is a head up display and the providing and adjusting steps are performed in a head up display computer, the weather radar system, a synthetic vision system, or a display computer.

18. The method of claim 12, wherein the electronic display is a head up display.

19. The method of claim 12, wherein the adjusting steps use a non-GPS derived parameter to determine the movement.

20. An apparatus for use with a weather radar system, the apparatus comprising:
- means for generating a first frame from weather radar data from the weather radar system at a first frequency, the first frame being representative of terrain sensed by the weather radar system;
- means for providing a second frame at a second frequency based upon the first frame in accordance with movement of the aircraft from a time of reception of the weather radar data; and
- means for merging a third frame from a terrain source with the second frame at a frequency greater than or equal to the first frequency, to provide a terrain display frame for viewing on a display.

* * * * *